United States Patent
Krupa et al.

(10) Patent No.: US 10,608,403 B2
(45) Date of Patent: Mar. 31, 2020

(54) DEVICE FOR GENERATING A BEAM OF PHOTONS WITH WAVELENGTHS DEFINING A SUBSTANTIALLY CONTINUOUS SUPERCONTINUUM

(71) Applicants: CENTRE NATIONAL DE LA RECHERCHE SCIENTIFIQUE, Paris (FR); UNIVERSITE DE LIMOGES, Limoges (FR)

(72) Inventors: Katarzyna Krupa, Limoges (FR); Badr Shalaby, Limoges (FR); Alessandro Tonello, Limoges (FR); Vincent Couderc, Verneuil-sur-Vienne (FR)

(73) Assignees: CENTRE NATIONAL DE LA RECHERCHE SCIENTIFIQUE, Paris (FR); UNIVERSITE DE LIMOGES, Limoges (FR)

( * ) Notice: Subject to any disclaimer, the term of this patent is extended or adjusted under 35 U.S.C. 154(b) by 0 days.

(21) Appl. No.: 16/093,120

(22) PCT Filed: Mar. 31, 2017

(86) PCT No.: PCT/EP2017/057760
§ 371 (c)(1),
(2) Date: Oct. 11, 2018

(87) PCT Pub. No.: WO2017/178255
PCT Pub. Date: Oct. 19, 2017

(65) Prior Publication Data
US 2019/0123506 A1    Apr. 25, 2019

(30) Foreign Application Priority Data

Apr. 13, 2016 (FR) ..................... 16 53252

(51) Int. Cl.
*G02F 1/365* (2006.01)
*H01S 3/30* (2006.01)
(Continued)

(52) U.S. Cl.
CPC .............. *H01S 3/302* (2013.01); *G02F 1/365* (2013.01); *H01S 3/067* (2013.01); *G02F 2001/3528* (2013.01)

(58) Field of Classification Search
CPC .. G02F 1/365; G02F 2001/3528; H01S 3/067; H01S 3/302
See application file for complete search history.

(56) References Cited

U.S. PATENT DOCUMENTS 5,960,146 A * 9/1999 Okuno ............... G02B 6/02247
359/332
6,097,870 A   8/2000 Ranka et al.
(Continued)

OTHER PUBLICATIONS

Jun Liu, et al., "Femtosecond pulses cleaning by transient-grating process in Kerr-optical media," Chin. Opt. Lett. 9, 051903-1-051903-3 (Year: 2011).*
(Continued)

*Primary Examiner* — Daniel Petkovsek
(74) *Attorney, Agent, or Firm* — Baker & Hostetler LLP

(57) ABSTRACT

A generating device includes at least one pulsed laser source that delivers primary photons having at least one wavelength in a single spatial mode and in pulses having a high pump energy, forming means that act on the primary photons to deliver an input beam, and at least one optical fiber having at least ten modes between which the pump energy is initially distributed, and able to relocate the latter via a non-linear effect into a fundamental mode, before generating secondary photons of various wavelengths by wavelength conversions from the wavelength of the primary photons in the fundamental spatial mode.

20 Claims, 3 Drawing Sheets

(51) Int. Cl.
*H01S 3/067* (2006.01)
*G02F 1/35* (2006.01)

(56) References Cited

U.S. PATENT DOCUMENTS

| | | | | |
|---|---|---|---|---|
| 6,972,894 | B2* | 12/2005 | Bjarklev | B82Y 20/00 |
| | | | | 359/332 |
| 7,800,817 | B2* | 9/2010 | Couderc | G02F 1/365 |
| | | | | 359/326 |
| 8,643,940 | B2* | 2/2014 | Kudlinski | G02F 1/353 |
| | | | | 359/326 |
| 8,804,777 | B2* | 8/2014 | Zhu | H01S 3/06716 |
| | | | | 372/101 |
| 9,235,106 | B2* | 1/2016 | Jauregui | H01S 3/06737 |
| 2005/0117841 | A1* | 6/2005 | Braun | G02F 1/365 |
| | | | | 385/27 |
| 2012/0099340 | A1 | 4/2012 | Buchter | |
| 2014/0010497 | A1 | 1/2014 | Kelly et al. | |

OTHER PUBLICATIONS

Ramsay, et al., "Generation of infrared supercontinuum radiation: spatial mode dispersion and higher-order mode propagation in ZBLAN step-index fibers", Optics Express, vol. 21, Issue 9, pp. 10764-10771, Apr. 25, 2013.

Wright, et al., "Controllable spatiotemporal nonlinear effects in multimode fibres", Nature Photonics, vol. 9, pp. 306-310, Apr. 13, 2015.

Kamynin, et al., "Supercontinuum generation in the range 1.6-24 µm using standard optical fibres", Quantum Electronics, vol. 41, No. 11, Nov. 30, 2011.

Pourbeyram, et al., "Stimulated Raman scattering cascade spanning the wavelength range of 523 to 1750 nm using a graded-index multimode optical fiber", Appl. Phys., vol. 102, No. 20, May 20, 2013.

Krupa, et al., "Spatial beam self-cleaning in multimode fiber", Nature Photonics, 11(4), pp. 237-241, 2017.

* cited by examiner

DEVICE FOR GENERATING A BEAM OF PHOTONS WITH WAVELENGTHS DEFINING A SUBSTANTIALLY CONTINUOUS SUPERCONTINUUM

CROSS-REFERENCE TO RELATED APPLICATIONS

This application is a National Stage of International patent application PCT/EP2017/057760, filed on Mar. 31, 2017, which claims priority to foreign French patent application No. FR 1653252, filed on Apr. 13, 2016, the disclosures of which are incorporated by reference in their entirety.

FIELD OF THE INVENTION

The invention relates to devices responsible for generating a polychromatic beam of photons, and analyzing systems that use such devices.

BACKGROUND

As those skilled in the art know, in certain fields laser sources are used that deliver a beam of photons having wavelengths that are distributed substantially continuously over a large spectral width, typically a few tens of nanometers to a few hundred nanometers. This is in particular the case in the field of analysis of samples (possibly medical samples).

These polychromatic sources, which are frequently called continua, generally result from a light-matter interaction involving nonlinear effects. They often comprise at least one pulsed laser source that delivers "primary" photons having a "primary" wavelength, and an optical fiber that is micro-structured in order to produce, from the primary photons, an output beam containing secondary photons having a number of "secondary" wavelengths (that together form a supercontinuum).

A non-linear micro-structured optical fiber is generally made of silica and comprises micro-structures that are intended to confine the light power in order to increase the light-matter interaction and thus improve the conversion of the primary wavelength to many secondary wavelengths. By way of example, these micro-structures may form a Bragg grating that is transverse to the propagation direction of the light in the optical fiber and that is able to modify the dispersion relationship seen by the light.

By virtue of this type of source, i.e. sources that employ one or more micro-structured optical fibers, it is possible to obtain stable emissions with a spectral width ranging from the near ultraviolet (or UV) (about 350 nm) to the mid infrared (typically 5 µm). The performance of micro-structured optical fibers made of silica is for example limited in the infrared beyond about 2.4 µm.

Unfortunately, the core of these micro-structured optical fibers is of small diameter. Therefore, when energy is highly confined thereto, the threshold for damage to their core material is very quickly reached, and therefore sources employing them cannot deliver high output energies. Moreover, when these microstructured optical fibers are pumped in the normal dispersion regime, this induces a non-continuous generation of the conversion spectrum via the stimulated Raman effect, and hence sources employing them cannot be considered to be veritable continua.

As a result these sources cannot be used in certain applications, such as for example multiplex coherent anti-Stokes Raman scattering (CARS) microspectroscopy, because of the spectral non-continuity of the emitted radiation. It will be recalled that multiplex CARS microspectroscopy is in particular used in the field of imaging and of spectroscopy to identify and locate specific chemical species within a sample or in an open space.

When it is desired to generate a supercontinuum with a very high energy, an optical fiber having a core diameter that is notably larger than that of a single-mode or quasi-single-mode micro-structured optical fiber must be used. To this end, a multimode optical fiber may be used.

The latter type of optical fiber allows higher energies to be guided but does not have the capacity to greatly modify the dispersion of the guide because of its large core width. The radiation output is equally distributed between a plurality of modes, this greatly decreasing the brightness of the output radiation.

A supercontinuum may be created in optical fibers by virtue, in particular, of a mix of the Raman effect and of parametric processes. Because of the Raman effect and of the dispersion regime, the secondary photons of the supercontinuum are generated at wavelengths that are above the primary (or pump) wavelength, this making it difficult to generate secondary wavelengths in a spectral domain below that of the pump wave. For an excitation wavelength located in the normal dispersion regime, the wavelengths of the supercontinuum are generated in packets because of the non-continuous profile of the Raman gain, this preventing a veritable spectral continuity from being achieved. Despite the partial modal filtering induced by the Raman conversion, the output radiation is also obtained in many modes, this decreasing the brightness and spatial coherence of the source.

SUMMARY OF THE INVENTION

The aim of the invention is in particular to improve the situation in terms of brightness and of spectral continuity.

It in particular provides to this end a device, intended to generate a polychromatic beam of photons, and comprising at least one pulsed laser source that is able to deliver primary photons having at least one wavelength in a single spatial mode, forming means that are able to act on the primary photons to deliver an input beam, and at least one optical fiber that is arranged to produce from the input beam a polychromatic output beam containing secondary photons having a plurality of wavelengths.

This generating device is characterized in that:
  its pulsed laser source is able to deliver the primary photons in pulses having a high pump energy, and
  each optical fiber has at least ten modes, one of which is called a fundamental mode, and between which modes the pump energy of the primary photons is initially distributed, and is able to relocate this pump energy via a non-linear effect into the fundamental mode, before generating the secondary photons of various wavelengths by wavelength conversions from the wavelength of the primary photons in the fundamental mode.

Thus, by using a very multimode optical fiber pumped by high-energy pulses, it is advantageously possible to obtain a highly spatially coherent photon supercontinuum in the fundamental mode and in the visible and infrared domains, with a continuous spectrum.

The device according to the invention may include other features that may be implemented separately or in combination, and in particular:
  the relocation of the pump energy of the primary photons may be controlled by at least one parameter that is chosen from among (at least) a modification of the coupling of the energy to the optical fiber, an index variation profile of the core of the optical fiber, and a polarization of the input beam;

its forming means may be arranged to act on the primary photons so that the input beam is somewhat divergently coupled to the core of the optical fiber;

its forming means may be arranged to act on the primary photons so that the input beam may have a linear or elliptical polarization;

its/each optical fiber may comprise a core having an index variation profile chosen from among (at least) a group comprising a parabolic profile, a Gaussian profile, a super-Gaussian profile, a triangular profile, a Lorentzian profile, a multi-lobe profile, a squared-hyperbolic-secant profile, and a rectangular profile;

the wavelength conversions may be chosen from among (at least) a conversion by self-phase modulation, a conversion by cross-phase modulation, a conversion by Raman effect, a convergent by soliton effect, and a conversion by parametric mixing;

its/each optical fiber may be doped with ions. In this case it may also comprise an auxiliary laser source that is able to inject, into the/each optical fiber, auxiliary photons that are intended to interact with the ions in order to induce an increase in the conversion to the secondary photons;

its/each optical fiber may have a longitudinal periodic marking able to induce an improvement in the relocation of the pump energy of the primary photons;

its/each optical fiber may have an adiabatic taper;

its/each optical fiber may be what is called a "polarization-maintaining" optical fiber;

its/each optical fiber may have a transverse geometry chosen from among (at least) a circular geometry, a rectangular geometry, and a hexagonal geometry;

its/each optical fiber may be mechanically stressed so as to promote the relocation of the pump energy of the primary photons;

its/each optical fiber may have at least twenty modes;

it may comprise a plurality of (at least two) optical fibers;

its pulsed laser source may be able to deliver the primary photons in pulses having a duration comprised between a few hundred nanoseconds and a few tens of nanoseconds;

it may comprise a resonant cavity including, on the one hand, a semi-reflective entrance mirror able to receive the input beam, and to which an entrance of the/each optical fiber is fastened, and, on the other hand, a semi-reflective exit mirror that is able to deliver the output beam;

the relocation of the pump energy of the primary photons via a non-linear effect may advantageously be carried out into a high mode, the LP11 mode or higher.

The invention also provides a system for analyzing samples comprising at least one generating device of the type presented above and able to deliver a polychromatic output beam for analyzing the sample.

For example, such a system may be able to carry out an analysis of the sample by multiplex coherent anti-Stokes Raman scattering (or CARS).

Also for example, such a system may be able to carry out an analysis of the sample by linear fluorescence and non-linear fluorescence.

BRIEF DESCRIPTION OF THE DRAWINGS

Other features and advantages of the invention will become apparent on examining the following detailed description, and the appended drawings, in which.

DETAILED DESCRIPTION

The aim of the invention is in particular to provide a device DG intended to generate a quasi-single-mode output beam FS of high brightness and in which the photons have wavelengths defining a substantially continuous (super)continuum.

In what follows, the generating device DG will be considered, by way of nonlimiting example, to be intended to form part of a system for analyzing samples (optionally of medical type). However, the invention is not limited to this type of system. Specifically, it relates to any system required to comprise at least one device able to generate a polychromatic beam of photons.

Moreover, in what follows, by way of nonlimiting example, the analyzing system is considered to be able to carry out multiplex coherent anti-Stokes Raman scattering (CARS) analyses of samples. Such samples may, for example, be blood samples. However, the invention is not limited to this type of analysis. Thus, it also relates, for example, to analyses of samples by linear fluorescence and non-linear fluorescence.

Generally, the invention relates to many fields, and in particular to biophotonics (and in particular cellular diagnostics), coherence tomography, flow cytometry, remote screening for chemical elements (for example for airport security), the inspection of individuals (for example in the medical field), the detection of explosives and the detection of bacteria.

Figure 1:
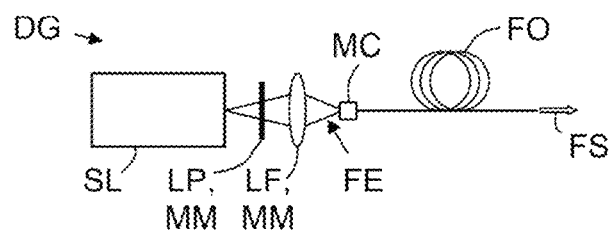
FIG. 1 schematically and functionally illustrates a first example embodiment of a generating device according to the invention.
Figure 4:
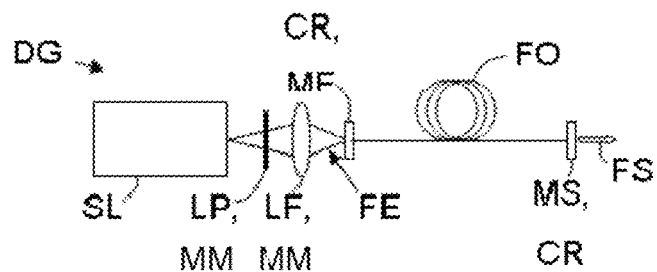
FIG. 4 schematically and functionally illustrates a second example embodiment of a generating device according to the invention.
Figure 5:
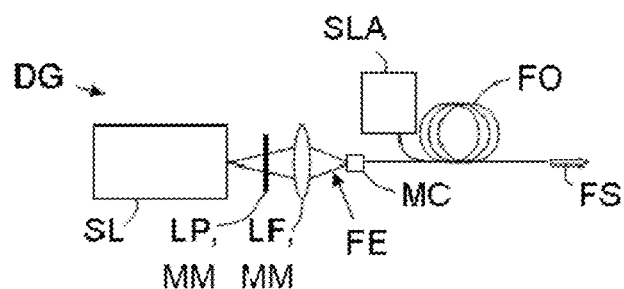
FIG. 5 schematically and functionally illustrates a third example embodiment of a generating device according to the invention.

FIGS. 1, 4 and 5 schematically show three nonlimiting example embodiments of a generating device DG according to the invention.

As illustrated, a (generating) device DG, according to the invention, comprises at least one pulsed laser source SL, forming means MM, and at least one multimode optical fiber FO.

The pulsed laser source (or pump laser) SL is able to deliver what are called "primary" photons that have a least one wavelength that is called the "primary" (or pump) wavelength below. This primary (or pump) wavelength is chosen depending on the requirements of the application, and therefore on the desired spectral band. Therefore, it will possibly belong to the domain of the infrared (or IR), of the visible or of the ultraviolet (or UV). These primary photons may also belong to a plurality of domains such as for example an infrared wavelength and its second harmonic.

In addition, the pulsed laser source SL is able to deliver the primary photons in pulses that have a high pump energy (or peak pump power). Preferably, this peak power is higher than 30 kW, this corresponding to an intensity higher than 5 $GW/cm^2$.

For example, this pulsed laser source SL may comprise an Nd:YAG laser producing photons of 1064 nm with pulses ranging from 10 ps to 50 ns. However it can also comprise a microlaser or mode-locked laser or even a gain-switched laser, for example.

In the three examples nonlimitingly illustrated in FIGS. 1, 4 and 5, the (generating) device DG comprises only a single pulsed laser source SL producing the input beam FE. However it could include a plurality (at least two) thereof, the pulsed laser sources being different from but not necessarily coherent with one another.

The forming means MM are able to act on the primary photons to deliver an input beam FE, which may be focused or divergent. For example, the forming means MM may be arranged to act on the primary photons so that the input beam FE is coupled somewhat divergently to the core of the optical fiber FO.

Preferably, these forming means MM are also arranged to act on the primary photons so that the input beam FE has a chosen polarization (or direction of oscillation of the field). This polarization is preferably linear. However, it could also be circular or elliptical. It will be noted that the (pulsed) laser source SL delivers a beam that is already polarized and therefore that the latter polarization may be turned, or modified, with a half-wave plate or a quarter-wave plate outside of the laser cavity in order to promote certain non-linear effects. The orientation/modification of the polarization with respect to the optical fiber FO therefore allows the final spectrum to be modified (moderately). The modification of the divergence of the input pump beam allows the primary photons to be coupled in such a way as to excite a relatively large number of modes.

Figure 6A:
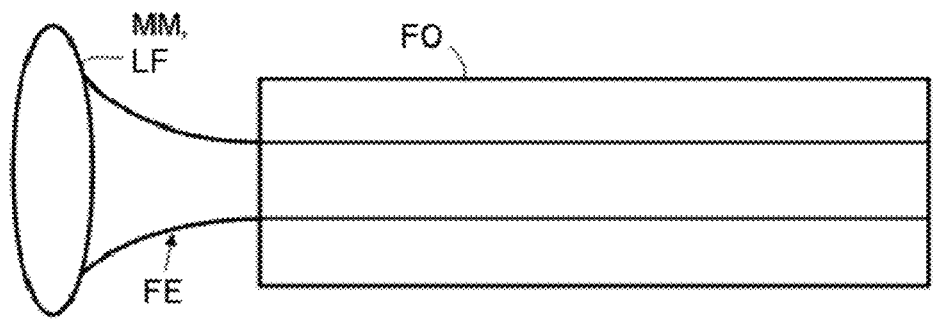
FIGS. 6A and 6B schematically illustrate examples of focus and defocus of the input beam into an optical-fiber core, respectively.
Figure 6B:
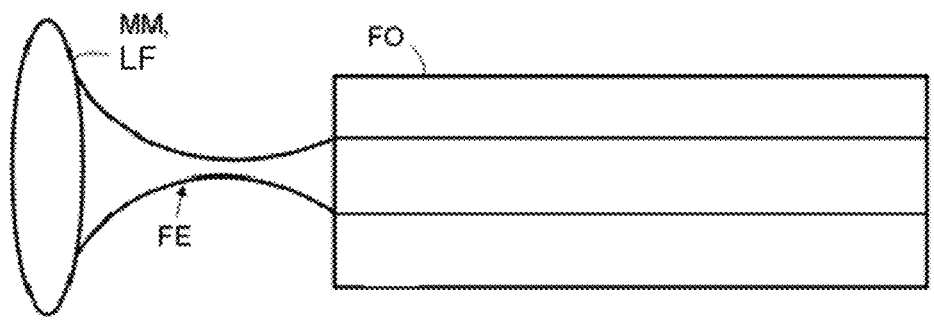

In the three examples illustrated nonlimitingly in FIGS. 1, 4 and 5, the forming means MM comprise, downstream of the pulsed laser source SL with respect to the propagation direction of the primary photons, a wave plate LP that is able to give the primary photons a chosen polarization (for example a linear polarization) and a focusing lens LF that is able to couple the primary photons to the optical fiber FO, via a focusing or defocusing effect, in order to excite a relatively large number of modes. FIGS. 6A and 6B show examples of focus and defocus of the input beam FE into a core of an optical fiber FO, respectively. It will be noted that the wave plate LP could be placed after the focusing lens LF.

The/each optical fiber FO is very multimode, this meaning that it has at least ten modes, and preferably at least twenty modes, and between which the pump energy of the primary photons of the input beam FE is initially distributed. It will be noted that one of these modes is called the fundamental mode.

It will be noted that in the three examples nonlimitingly illustrated in FIGS. 1, 4 and 5, the device DG comprises only a single optical fiber FO. However, it could comprise a plurality (at least two) thereof.

The/each optical fiber FO is able to receive the input beam FE and is arranged to produce a polychromatic output beam FS, containing what are called "secondary" photons having a plurality of wavelengths, from the input beam FE. For example, and as nonlimitingly illustrated, the entrance end of the optical fiber FO may be securely fastened to coupling means MC that receive, via an input, the input beam FE. These coupling means MC may, for example, take the form of a microlens-based coupler responsible for more precisely refocusing (or optionally defocusing) the input beam FE into the core of the entrance end of the optical fiber FO.

The/each optical fiber FO may, for example, be made of silica or of another material such as for example telluride, the chalcogenides, or fluoride glasses, and may optionally be doped. It may, for example, be of SF50 OM2 type or of 50/125 index-gradient type.

The/each optical fiber FO is able to relocate the pump energy (distributed between its various modes) via a non-linear effect into its fundamental mode, before generating the photons referred to as "secondary" photons, which have various wavelengths, by wavelength conversions from the (primary or pump) wavelength of the primary photons that are in the fundamental mode because of the relocation.

It will be noted that when the primary photons have a plurality of wavelengths, they all "relocate" into the fundamental mode.

The primary (pump) photons are coupled to the optical fiber FO so as to excite the largest number of its modes. The pump energy (of the primary photons) is then sufficiently high to induce its relocation (or its transfer) into a single mode, that called the fundamental mode. This is what is sometimes referred to as "spatial cleaning".

This transfer (or this relocation) of the pump energy is controlled via at least one parameter that is chosen from among at least a modification of coupling of energy to the optical fiber FO, the index variation profile of the core of the optical fiber FO, and the possible polarization of the input beam FE.

Preferably, the three aforementioned parameters are used to control the transfer (or the relocation). In this case, it is preferable, as mentioned above, for the input beam FE to have a linear polarization. Likewise, in this case, it is preferable for the core of the optical fiber FO to have an index variation profile chosen from a least a parabolic profile, a Gaussian profile, a super-Gaussian profile (for example resulting from holes), a triangular profile, a Lorentzian profile, a multi-lobe profile, a squared-hyperbolic-secant profile and a rectangular profile.

This spatial cleaning achieved by relocation occurs by virtue of the influence of a non-linear effect (and more precisely the Kerr effect) which serves as a precursor to the transfer of energy between the various modes of the optical fiber FO. A substantial improvement in the brightness of the output beam FS results therefrom.

Next, all the energy of the primary photons, which has been relocated into the fundamental mode, is used to broaden the spectrum into the infrared or visible domain by wavelength conversions resulting from at least one non-linear effect.

Preferably, these wavelength conversions are chosen from among at least one conversion by self-phase modulation, a conversion by cross-phase modulation, a conversion by Raman effect, a conversion by soliton effect, and a conversion by parametric mixing. As regards the conversion by Raman cascades, it is advantageous for the pump energy to induce a saturation of the Raman gain, because this makes it possible to make the output spectrum flat from the energy point of view, in the normal dispersion regime.

Figure 2:
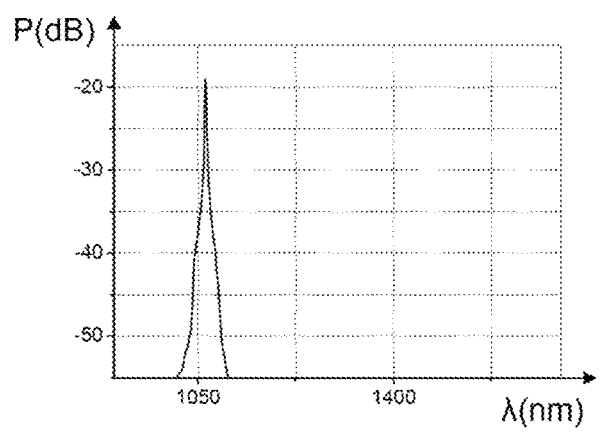
FIG. 2 schematically illustrates with a graph an example of the variation in the power (P in dB) of the entrance beam of a generating device according to the invention as a function of wavelength ($\lambda$ in nm)

FIG. 2 illustrates an example of the variation, as a function of wavelength λ (in nm), in the power (in dB) of the input beam FE of the device DG. Here, the laser source SL generates primary photons the (pump) wavelength of which is equal to 1064 nm.

Figure 3:
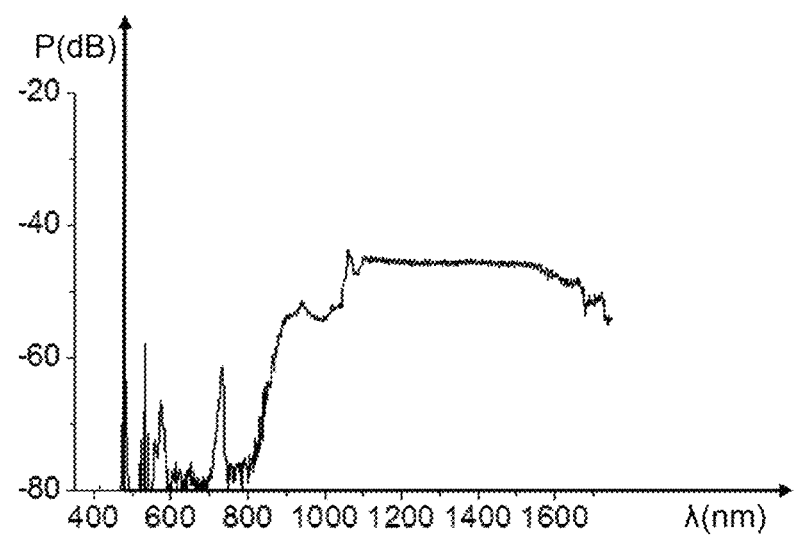
FIG. 3 schematically illustrates with a graph an example of the variation, as a function of wavelength ($\lambda$ in nm), in the power (P in dB) of the output beam of a generating device according to the invention, having as input beam the beam the pattern of variation of which is illustrated in FIG. 2.

FIG. 3 illustrates an example of the variation, as a function of wavelength λ (in nm), in the power (in dB) of the beam FS output by the device DG when its input beam FE has the pattern of variation illustrated in FIG. 2. As may be seen, a substantially continuous spectrum is here obtained over about 800 nm, this spectrum in addition being particularly flat from the energy point of view over almost 400 nm. Such a spectrum is well suited to many applications, and in particular to multiplex CARS micro-spectroscopy.

A more detailed explanation of the mechanisms allowing the obtainment of a substantially continuous polychromatic output beam FS to be explained is given below.

Initially, the primary (pump) photons form a high-power, (here) longitudinally monochromatic, spatially single-mode laser wave that is coupled to the multimode optical fiber FO. During the propagation into the first centimeters of the optical fiber FO, the spatial profile of this laser wave is modified and becomes slightly multimode under the effect of differences in group velocity between the various modes.

The linear coupling between these modes allows a periodic image (hotspot) to be obtained the entire length of the propagation through the optical fiber FO. This periodicity depends on propagation constants of the interacting modes.

Because of the high-power, this periodic image allows a periodic modulation of the index of the core of the optical fiber FO (via the Kerr effect), which then delivers a phase match between the modes (this is what is called four-wave mixing). This phase match then allows a transfer of the energy of the various modes to the mode that possesses the lowest speed, namely the fundamental mode.

Subsequently, because of its high energy (resulting from the transfer) this fundamental mode detaches from the other modes under the effect of self-phase modulation, thereby stopping the process of energy transfer and definitively trapping the energy in this single fundamental mode. The energy of the primary photons is thus relocated to the fundamental mode.

Figure 7:
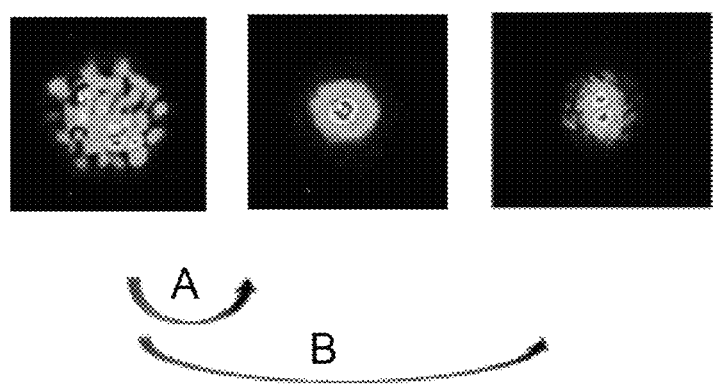
FIG. 7 schematically illustrates the results of two types of cleaning of the input beam.

According to one variant of the invention, it will be noted that the relocation of the pump energy of the primary photons via a non-linear effect may be carried out into a high mode, the LP11 mode or higher. FIG. 7 illustrates two types of "cleaning" of the input beam: cleaning of the fundamental mode (arrow A), and cleaning of the high-order L11 mode (arrow B).

Next, under the effect of wavelength conversion mechanisms that are present in the fiber (self-phase modulation and/or crossed-phase modulation and/or the Raman effect and/or soliton effects and/or parametric mixing), the wavelength of the primary photons of this single transverse fundamental mode is converted to other wavelengths, also in this fundamental mode. In other words, a supercontinuum of light is obtained in a single spatial mode.

It will be noted that the laser source SL may be able to deliver the primary photons in pulses that have a duration comprised between a few hundred nanoseconds and a few tens of nanoseconds. These preferential pulse durations are intended to make sure the propagation regime is one that allows the effects of temporal separation between the various modes between which the pump energy is distributed to be neglected (the duration of the pulse must then be longer than the group time difference between the modes). For shorter durations dispersion effects become problematic, and for longer durations it is difficult to obtain pulses with high peak powers.

It will also be noted, as nonlimitingly illustrated in the second example of FIG. 4, that the device DG may also comprise a resonant cavity CR housing its/each optical fiber FO. This resonant cavity CR allows an oscillation of the secondary photons, able to induce an amplification of the non-linear wavelength conversions. This resonant cavity CR is preferably used with long primary pulses. Such a resonant cavity CR may comprise, on the one hand, a semi-reflective entrance mirror ME, able to receive the input beam FE and, for example, to which the entrance of the/each optical fiber FO is fastened, and, on the other hand, a semi-reflective exit mirror MS, to which the exit of the optical fiber FO is for example fastened, and able to deliver the exit beam FS.

It will also be noted that the/each optical fiber FO may be doped with ions. In this case, and as nonlimitingly illustrated in the third example of FIG. 5, the device DG may also comprise an auxiliary laser source SLA that is able to inject, into the optical fiber FO, auxiliary photons that are intended to interact with the ions to induce an increase in the conversion to the secondary photons.

For example, the/each optical fiber FO may be doped with rare-earth ions, and in particular neodymium ions, ytterbium ions, praseodymium ion, holmium ions, erbium ions or thulium ions. By way of example, the emission wavelength of the auxiliary laser source SLA may be equal to 980 nm for ytterbium (Yb) and erbium (Er) ions, or to 808 nm for neodymium (Nd) ions.

As a variant, the/each optical fiber FO may be doped with other types of ions, for example germanium or chromium ions.

It will also be noted that the/each optical fiber FO may have a periodic longitudinal marking able to induce an improvement in the relocation of the pump energy of the primary photons. This marking may be produced by beating two monochromatic wavelengths ("optical poling" is then spoken of), but also by repeated illumination with a UV laser that locally modifies the index of the core of the silica.

It will also be noted that the/each optical fiber FO may have an adiabatic taper. The objective of this taper of the core of the optical fiber FO is to filter high-order modes and thus improve the cleaning of the beam.

It will also be noted that the/each optical fiber FO may be a "polarization-maintaining" optical fiber. Specifically, a modification of the polarization state may decrease the efficiency of the non-linear conversion to other wavelengths.

It will also be noted that the/each optical fiber FO may have a transverse geometry chosen from among at least a circular geometry, a rectangular geometry, and a hexagonal geometry. This geometry allows the propagation constants of the modes to be modified and a greater or lesser number of nonlinear effects of the four-wave modal mixing type to be generated.

It will also be noted that the/each optical fiber FO may be mechanically stressed in order to promote the relocation of the pump energy of the primary photons. To this end, the/each optical fiber FO may, for example, be wound around a device allowing mechanical stresses to be induced therein (passively or actively), these stresses being intended to break the orthogonality between its various modes and thus promote the occurrence of the spatial relocation. It may, for example, be a mechanical mandrel around which an optical fiber FO is wound. The modification of the diameter of the mandrel stretches the optical fiber FO and results in a mechanical stress.

It will also be noted that it is possible to envision using a plurality of optical fibers FO, one after the other, and optionally having different properties. This allows, for example, the transparency of the material to be adapted during the gradual broadening of the spectrum. By way of example, it is possible to use an optical fiber made of silica for an extension to 2.4 µm, then an optical fiber made of fluoride glass to achieve 5 µm. This also allows the nonlinearity of the material to be adapted along the entire length of the propagation.

The invention has a number of advantages, among which:
it allows a substantially continuous (super-)continuum to be obtained with a high spectral power density;
it allows the coherence of the wideband radiation, which coherence is generally deteriorated by multimodal propagation, to be improved.

The invention claimed is:

1. A device for generating a polychromatic beam of photons, said device comprising:
    at least one pulsed laser source configured to deliver primary photons having at least one wavelength in a single spatial mode,
    forming means configured to act on said primary photons to deliver an input beam, and
    at least one optical fiber configured to produce from said input beam a polychromatic output beam containing secondary photons having a plurality of wavelengths,
    wherein said at least one pulsed laser source is configured to deliver said primary photons in pulses having a pump energy,
    wherein said optical fiber has at least ten modes, one of which is a fundamental mode, and between which said pump energy of the primary photons is initially distributed, and
    wherein an index variation profile of a core of said optical fiber is able configured to relocate said pump energy via Kerr effect into said fundamental mode, before generating said secondary photons of various wavelengths by wavelength conversions from said wavelength of the primary photons in said fundamental mode.

2. The device as claimed in claim 1, wherein said relocation of the pump energy of the primary photons is controlled by at least one parameter chosen from a group comprising a modification of coupling of energy to said optical fiber and a polarization of said input beam.

3. The device as claimed in claim 2, wherein said forming means are configured to act on said primary photons so that said input beam is divergently coupled to said core of the optical fiber.

4. The device as claimed in claim 2, wherein said forming means are configured to act on said primary photons so that said input beam has a linear or elliptical polarization.

5. The device as claimed in claim 2, wherein said optical fiber comprises a core having an index variation profile chosen from a group comprising a parabolic profile, a Gaussian profile, a super-Gaussian profile, a triangular profile, a Lorentzian profile, a multi-lobe profile, a squared-hyperbolic-secant profile, and a rectangular profile.

6. The device as claimed in claim 1, wherein said wavelength conversions are chosen from a group comprising a conversion by self-phase modulation, a conversion by cross-phase modulation, a conversion by Raman effect, a convergent by soliton effect, and a conversion by parametric mixing.

7. The device as claimed in claim 1, further comprising:
    an auxiliary laser source,
    wherein said optical fiber is doped with ions, and
    wherein the auxiliary laser source is configured to inject, into said optical fiber, auxiliary photons that are intended to interact with said ions in order to induce an increase in the conversion to said secondary photons.

8. The device as claimed in claim 1, wherein said optical fiber has a longitudinal periodic marking configured to relocate the pump energy of the primary photons.

9. The device as claimed in claim 1, wherein said optical fiber has an adiabatic taper.

10. The device as claimed in claim 1, wherein said optical fiber is a polarization-maintaining optical fiber.

11. The device as claimed in claim 1, wherein said optical fiber has a transverse geometry chosen from a group comprising a circular geometry, a rectangular geometry, and a hexagonal geometry.

12. The device as claimed in claim 1, wherein said optical fiber is mechanically stressed to promote said relocation of the pump energy of the primary photons.

13. The device as claimed in claim 1, wherein said optical fiber has at least twenty modes.

14. The device as claimed in claim 1, wherein said at least one optical fiber comprises a plurality of optical fibers.

15. The device as claimed in claim 1, wherein said pulsed laser source is configured to deliver said primary photons in pulses having a duration comprised between two hundred nanoseconds and twenty nanoseconds.

16. The device as claimed in claim 1, further comprising:
    a resonant cavity including i) a semi-reflective entrance mirror configured to receive said input beam, and to which an entrance of said optical fiber is fastened, and ii) a semi-reflective exit mirror that is configured to deliver said output beam.

17. The device as claimed in claim 1, wherein the pump energy is greater than 30 kilo-Watts (kW).

18. A system for analyzing one or more samples, comprising:
    at least one generating device, as claimed in claim 1, configured to deliver a polychromatic output beam for analyzing said one or more samples.

19. The system as claimed in claim 18, wherein the system is configured to carry out an analysis of said one or more samples by multiplex coherent anti-Stokes Raman scattering.

20. The system as claimed in claim 19, wherein the system is configured to carry out an analysis of said one or more samples by linear fluorescence and non-linear fluorescence.

* * * * *

UNITED STATES PATENT AND TRADEMARK OFFICE
CERTIFICATE OF CORRECTION

PATENT NO. : 10,608,403 B2
APPLICATION NO. : 16/093120
DATED : March 31, 2020
INVENTOR(S) : Katarzyna Krupa et al.

Page 1 of 1

It is certified that error appears in the above-identified patent and that said Letters Patent is hereby corrected as shown below:

In the Claims

In Claim 1, Column 9, Line 33, "fiber is able configured to" should be -- fiber is configured to --.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*